United States Patent Office 3,803,193
Patented Apr. 9, 1974

3,803,193
PROCESS FOR PREPARING SUBSTANTIALLY CHLORIDE-FREE ANTIMONY ALKOXIDES
John J. Ventura, Eatontown, David A. Daniels, Kendall Park, and Otto E. Loeffler, Rahway, N.J., assignors to M & T Chemicals Inc., Greenwich, Conn.
No Drawing. Filed June 1, 1971, Ser. No. 149,075
Int. Cl. C07f 7/94
U.S. Cl. 260—446
4 Claims

ABSTRACT OF THE DISCLOSURE

Antimony trialkoxides are prepared in high yield and purity by the controlled addition of ammonia to a reaction mixture containing a monohydric alcohol and an antimony tricarboxylate.

BACKGROUND OF THE INVENTION

This invention relates to an improved method for preparing antimony trialkoxides derived from monohydric alcohols.

The invention further relates to a method for preparing high yields of antimony trialkoxides in a substantially pure form, particularly with respect to detectable amounts of chloride ion.

Antimony derivatives of polyhydric alcohols, e.g. ethylene glycol and pentaerythritol, have been prepared by heating a mixture of antimony trioxide and the corresponding alcohol to temperatures of 150° C. or higher for several hours while continuously removing the water formed as a by-product of the reaction. Little, if any, of the desired product is obtained when one attempts to apply this method to monohydric alcohols containing less than about 8 carbon atoms. Antimony derivatives of these monohydric alcohols are usually prepared by reacting antimony trichloride with the appropriate alkali metal alkoxide, e.g. sodium butoxide. This method has one serious drawback, namely, that traces of chloride ion remain in the product even after several distillations or other attempts to purify the product. This may be due in part to the high volatility of antimony trichloride. Even trace amounts of chloride in antimony alkoxides makes them unsuitable for one of the major end use applications of these compounds, namely as a polycondensation catalyst for the preparation of poly(ethylene terephthalate) and other aromatic polyesters. At the elevated temperatures employed during polymerization and shaping of the molten polymer, the chloride salts are highly corrosive, causing severe damage to exposed metal surfaces of polymerization and shaping equipment. In addition to the adverse effects of corrosion on the equipment, contamination of the molten polymer by the corrosion products may impart an undesirable color to the final product, e.g. a fiber of film, that will seriously impair if not entirely destroy its commercial value.

In addition to the foregoing disadvantages, antimony trichloride is considerably more costly than other trivalent antimony compounds, e.g. antimony trioxide. The trichloride is reacted with an alkali metal alkoxide, which is usually prepared from the corresponding alcohol. This requires an additional costly processing step.

One object of this invention is to provide an efficient method for preparing high yields of substantially pure, chloride-free antimony trialkoxides.

A second object of this invention is to provide a method for preparing substantially pure antimony trialkoxides employing relatively inexpensive, readily available starting materials and relatively moderate reaction conditions.

SUMMARY OF THE INVENTION

The present invention provides a novel, improved method for preparing antimony trialkoxides derived from monohydric alcohols, said method comprising the following sequence of steps.

(1) Adding a substantially stoichiometric amount of anhydrous ammonia to an anhydrous reaction mixture comprising an antimony tricarboxylate of the formula

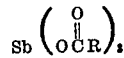

and at least a stoichiometric amount, with respect to the antimony tricarboxylate, of a monohydric alcohol having the formula R'OH, R and R' being independently selected from the group consisting of monovalent aliphatic hydrocarbon radicals containing between one and twelve carbon atoms, such that the temperature of said reaction mixture is maintained below about 20° C. during the ammonia addition.

(2) Maintaining the reaction mixture at ambient temperature for a sufficient time to ensure a substantially complete reaction.

(3) Isolating the antimony trialkoxide.

DETAILED DESCRIPTION OF THE INVENTION

The reaction between an antimony tricarboxylate and a monohydric alcohol reportedly involves an equilibrium which can be represented by the following equation:

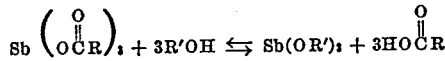

In accordance with the present method, anhydrous ammonia is added to the antimony carboxylate-alcohol mixture. The ammonia reacts with the carboxylic acid obtained as a by-product to form the ammonium salt of the acid. The salt is substantially insoluble in the organic reaction medium, thereby making the acid unavailable for further reaction and displacing the equilibrium in the desired direction, favoring formation of the antimony trialkoxide.

Monohydric alcohols suitable for use in the method of this invention contain between one and 12 carbon atoms, which may be in a linear or branched configuration. Suitable alcohols include but are not limited to methanol, n-propanol, isopropanol, n-butanol, n-hexanol, n-octanol, 2-ethylhexanol and n-dodecanol.

Suitable antimony tricarboxylates are derived from acids that contain between one and twelve carbon atoms. The relatively low cost and availability of antimony triacetate makes it a preferred reactant for use in the present invention. Other useful antimony salts include but are not limited to antimony tri-n-butyrate, antimony tri-n-hexanoate, antimony tri-n-octoate, antimony tri-2-ethylhexanoate and antimony tri-n-dodecanoate.

The antimony tricarboxylate may be conveniently prepared by reacting the corresponding carboxylic acid anhydride with antimony trioxide, preferably in the presence of an aromatic hydrocarbon diluent to moderate the highly exothermic reaction. External cooling is usually required to maintain the temperature of the reaction mixture between about 75–120° C., preferably 110–120° C. A slight excess (about 10%) of the anhydride is desirably employed to achieve maximum yield of carboxylate.

The free carboxylic acid may be employed in place of the anhydride; however, this necessitates removing the water, formed as a by-product, from the reaction mixture. The water may be conveniently removed as an azeotrope with the hydrocarbon diluent. The resultant antimony tricarboxylate may be isolated and purified prior to being reacted with the alcohol. More conveniently, the alcohol is added to a reaction mixture containing the crude carboxylate without any intermediate purification steps.

When the anhydride is used to prepare the carboxylate, it is preferable to add a slight excess (up to 10%) of the alcohol, which will react with the anhydride to form substantially equimolar amounts of the corresponding ester and free acid. Prior to addition of the alcohol, it is desirable to have the antimony tricarboxylate at a temperature between about 80–85° C. This will ensure that any unreacted acid anhydride from the carboxylate preparation will react with the alcohol rather than with the ammonia which is subsequently added. The aforementioned ester may readily be removed by distillation during isolation of the final product. Ammonia and acid anhydrides react to form amides, which are considerably more difficult to separate from the desired product than are the corresponding esters.

It is preferable to add the ammonia in the presence of substantially stoichiometric amounts of the alcohol and carboxylate, i.e. slightly more than three moles of alcohol per mole of carboxylate in combination with one or more liquid aromatic hydrocarbons. In contrast to alcohols, liquid aromatic hydrocarbons are good solvents for antimony tricarboxylates. Maintaining the carboxylate in solution provides a more fluid reaction mixture, increases the reactivity of the carboxylate and facilitates temperature control. Another reason to avoid using a large excess of alcohol is that alcohols dissolve a significant amount of the ammonium carboxylate, thereby increasing reactivity of the ammonium salt. In addition to making isolation of the desired product more difficult, the ammonium salt is believed to react with antimony trialkoxides, thereby decreasing product yield.

The reagents and all reaction equipment should be dried before use to ensure against introduction of atmospheric moisture. Prior to and during the ammonia addition, it is desirable to maintain a positive pressure of an inert gas, e.g. nitrogen within the reaction vessel.

The reaction between ammonia and the carboxylic acid is highly exothermic, and cooling is usually required to maintain the temperature of the reaction mixture below about 20° C. Above about 25° C. the yield of antimony trialkoxide progressively decreases to the extent that substantially none of the desired product is isolated if the temperature exceeds about 60° C.

The reaction mixture is cooled to below about 20° C. preferably below 10° C. prior to addition of the anhydrous ammonia, which is introduced at the maximum rate that will permit the temperature of the reaction mixture to be maintained below about 20° C. with external cooling. The cooling bath preferably comprises an ice-sodium chloride-water mixture exhibiting a freezing point of about −20° C.

Addition of the ammonia is continued at least until the exothermic portion of the reaction is completed, as evidenced by a gradual decrease in reaction mixture temperature to approximately the temperature of the external cooling bath.

The amount of ammonia added may be in excess of the stoichiometry required for the reaction. If the antimony carboxylate is prepared in situ as described above, the excess ammonia will ensure neutralization of any free acid present.

Following completion of the ammonia addition, the reaction mixture may be maintained at substantially ambient temperature, i.e. 20–30° C. with stirring for about 0.5 hour to ensure a substantially complete reaction.

The by-product of the reaction, an ammonium carboxylate, is insoluble in the reaction medium and may readily be separated from the liquid phase by filtering the reaction mixture. The hydrocarbon diluent together with any unreacted alcohol is conveniently removed by concentrating the liquid phase at temperatures between about ambient and 120° C., preferably under pressures of between atmospheric and 20 millimeters of mercury. These conditions will ensure that none of the desired antimony trialkoxide is lost from the reaction mixture. The alkoxides exhibt boiling points above 110° C. under pressures of about 3 millimeters of mercury.

Exclusive of any contamination from external sources, the antimony trialkoxides prepared according to the method of this invention contain less than the detectable amount of chloride ion, i.e. less than about 5 parts per million. This low level of chloride ion concentration has heretofore been unobtainable using prior art methods for preparing antimony trialkoxides, e.g. antimony tri-n-butoxide, derived from alcohols containing fewer than about 12 carbon atoms.

The following example illustrates a preferred embodiment of the method of the present invention and should not be intrepreted as limiting the scope thereof.

The following reagents were charged into a dry, nitrogen-filled 2-liter capacity reaction vessel equipped with a mechanically driven agitator, thermometer, reflux condenser and gas inlet tube.

Antimony trioxide (175 g., 0.6 mole)
Acetic anhydride (212 g., 2.07 moles)
Xylene (125 g.)

The mixture was heated at a temperature of 120° C. for 3.5 hours, then cooled to 110° C. at which time 250 g. of xylene were added. When the temperature of the reaction mixture had decreased to 80° C., 313 g. (4.2 moles) of n-butanol were added and the reaction mixture cooled to 10° C. using an ice-water-sodium chloride mixture as the cooling bath. 72 g. (4.2 moles) of gaseous ammonia were then added gradually through the gas inlet tube, which extended beneath the surface of the reaction mixture. Addition of the ammonia required about 40 minutes, during which time the temperature of the reaction mixture was maintained between about 10 and 20° C. Following completion of the ammonia addition, the solid material in the reaction flask was removed by filtration under a nitrogen atmosphere, followed by a washing of the solids with 200 g. of xylene. The initial filtrate and the xylene from the washing were combined and distilled under reduced pressure. Following removal of the xylene, the fraction boiling at 115° C. under a pressure of 1 millimeter of mercury was collected. This fraction weighed 332 g. (81% yield) and contained 35.75% by weight of trivalent antimony. The theoretical percentage of antimony (calculated for antimony tributoxide) is 35.69%.

Although this invention has been illustrated by reference to specific examples, changes therein which clearly fall within the scope of the invention will be apparent to those skilled in the art. It is, therefore, to be limited solely by the scope of the appended claims.

What we claim is:

1. An improved method for preparing high yields of substantially chloride-free antimony trialkoxides of the formula $Sb(OR)_3$ wherein R represents an alkyl hydrocarbon radical containing up to 12 carbon atoms, said method comprising the following sequence of operations:
   (1) adding a substantially stoichiometric amount of anhydrous ammonia to a reaction mixture comprised at least in part of an antimony tricarboxylate exhibiting the formula

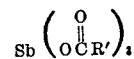

wherein R' is selected from the same group as R, and a substantially stoichiometric amount of a monohydric alcohol of the formula ROH;
   (2) maintaining the temperature of said reaction mixture below about 25° C. during the ammonia addition;
   (3) maintaining said reaction at ambient temperature for a period of time sufficient to attain substantially complete reaction; and
   (4) isolating the antimony trialkoxide.

2. The method of claim 1 wherein R represents a n-butyl radical and R' represents a methyl radical.

3. The method of claim 1 wherein said reaction mixture includes a liquid aromatic hydrocarbon.

4. A method for preparing antimony trialkoxides according to claim 1 wherein said antimony tricarboxylate is prepared by reacting antimony trioxide with the corresponding acid anhydride, whereupon said monohydric alcohol and ammonia are added to the reaction mixture as specified in claim 1 to produce said antimony trialkoxide.

References Cited

UNITED STATES PATENTS 3,223,736  12/1965  Hechenbleikner et al. __ 260—446
2,839,554  6/1958   Haslam _____ 260—446

WERTEN F. W. BELLAMY, Primary Examiner

U.S. Cl. X.R.

252—431